*United States Patent* [19]

Love

[11] Patent Number: 4,628,838

[45] Date of Patent: Dec. 16, 1986

[54] FLUIDIZED BED COMBUSTION METHOD
[75] Inventor: Richard E. Love, Darien, Conn.
[73] Assignee: Peabody Engineering Corp., Stamford, Conn.
[21] Appl. No.: 208,254
[22] Filed: Nov. 29, 1980
[51] Int. Cl.$^4$ ............................................. F23D 1/00
[52] U.S. Cl. .................................... 110/347; 110/245
[58] Field of Search .............. 110/263, 245, 278, 279, 110/280, 281, 282, 101 R, 346, 347; 122/4 D; 431/7, 170; 165/104.16; 34/57 A

[56] References Cited

U.S. PATENT DOCUMENTS

| | | | |
|---|---|---|---|
| 1,945,782 | 2/1934 | Jones | 126/182 |
| 2,499,735 | 3/1950 | Ellis | 110/278 |
| 3,702,595 | 11/1972 | Mulrhead et al. | 110/8 R |
| 3,776,150 | 12/1973 | Evans et al. | 110/8 R |
| 3,814,568 | 6/1974 | Wittmann | 431/170 X |
| 4,066,024 | 1/1978 | O'Connor | 110/8 F |
| 4,154,585 | 5/1979 | Melcher | 55/99 |
| 4,250,818 | 2/1981 | Sigg | 110/257 X |

FOREIGN PATENT DOCUMENTS 55-38418  3/1980  Japan .................................. 110/245

OTHER PUBLICATIONS

McGraw-Hill Encyclopedia of Science and Technology, vol. 5, p. 346, (1966).

*Primary Examiner*—Edward G. Favors
*Attorney, Agent, or Firm*—St. Onge Steward Johnston & Reens

[57] ABSTRACT

A fluidized bed combustion apparatus, system and process in which the turbulent fluidized motion is imparted to the particles to be burned by mechanical means. The bed of combustible material may be fluidized on a fluidizing support screen which is vibrated by a motor drive. The fluidizing force may be directed so that, in addition to fluidizing the bed, it slowly moves the particles from a feed end of the bed to an ash or waste disposal end of the bed with combustion taking place during the travel from one end of the bed to the other. The degree of fluidization can be controlled by a master combustion control system. The air necessary to support combustion may be controlled by an inlet damper or by a variable speed combustion air fan controlled by an inlet damper or by a variable speed combustion air fan controlled by the master combustion control system as a ratio of the fuel input rate or desired firing rate. Stack gas analysis may be used to trim the combustion control system. The mechanically fluidized bed combustion apparatus, system and process of the invention achieves better control of firing rates and combustion air qualities with greater economical use in combustion units of various sizes.

2 Claims, 2 Drawing Figures

FLUIDIZED BED COMBUSTION METHOD

BACKGROUND OF THE INVENTION

This invention relates to fluidized bed combustion and in particular to an apparatus, system and process wherein the fluidization of the bed is achieved by mechanical means.

A fluidized bed results when a fluid, usually a gas, flows upward through a bed of suitably sized, solid particles at a velocity sufficiently high to buoy the particles, to overcome the influence of gravity, and to impart to them an appearance of great turbulence, similar to that of a violently boiling liquid. *McGraw-Hill Encyclopedia of Science and Technology*, Vol. 5, p. 346 (1966). Fluidized bed combustion has been found useful in the production of chemical reactions such as the oxidation of coal to produce heat for power generation and for process heat as well as in the disposal of combustible wastes through incineration.

In the conventional fluidized bed combustion system, the fluidized bed is produced by suspending the bed particles in a vertically rising stream of moving gas, such as air. The air moves fast enough to cause the particles to become suspended, but not entrained. The air-particle mixture takes on the characteristics of a "fluid". In a steam generation system in which the fluidized bed is utilized to burn coal, air is introduced at the bottom of a combustion chamber through a distributor plate which generally defines the lower boundary of the combustion chamber and contains perforations for passage of the air. Coal or other solids are fed into the combustion chamber and fluidized by the air which is injected in quantities and at pressures to produce the necessary fluidization while also providing combustion air. Such fluidized bed combustion systems generally provide a well mixed medium for efficient combustion and good heat transfer.

The prior art describes various and differing attempts at increasing the overall efficiency of fluidized bed combustion systems and overcoming process problems to enhance their operability and reliability. For example, U.S. Pat. No. 3,702,595, Muirhead et al., discloses a variation on a fluidized bed incinerator in which differential fluidization of the bed is brought about. That is, bed material in one region is fluidized to a greater degree of agitation than that at another region by either varying the size of the apertures in the air distributor plate or utilizing two separate air boxes positioned beneath the plate. Similarly, U.S. Pat. No. 3,776,150, Evans et al., discloses a fluidized bed system for incineration of solid wastes having two chambers with fluidizing gas inlets designed so that the fluidized bed in the first chamber is more highly fluidized than the fluidized bed in the second chamber.

U.S. Pat. No. 4,066,024, O'Connor, discloses what is said to be a rotating fluidized bed combustor in which a heated fluidized bed is formed by rotating a body of sand in a horizontal cylindrical drum. The sand is lifted and dropped from the bed through an open portion of the drum which is heated. The sand is carried up one side of the rotating drum by scoop-like baffles to an approximate surface angle of 30° whereupon it tumbles back producing a continuous rolling motion of the bed said to be not unlike the fluidizing effect achieved by forcing air or other gas up through a sand bed. The patent states that air may be introduced up through the bed to aid in combustion and that when such is done, the effect is virtually identical to a conventional fluidized bed incinerator although the air flow, not being needed for the fluidizing action, may be substantially less. Despite the statements in the patent, the "tumbling" of sand "downhill" as shown in its FIGS. 3–5 does not appear to provide a true fluidizing effect wherein the particles would posess turbulent motion.

U.S. Pat. No. 4,154,585, Melcher et al., relates to fluidized bed collectors used to remove fine ash, smoke and/or dust from combustion gases. In the system there disclosed, a grid used to impose an electric field and to polarize particles of the bed also performs as a distributor plate to support bed particles. Rappers are attached to such distributor plate and an apertured distributor plate to dislodge particles that may become attached to them.

Apart from fluidization, combustion apparatus have utilized apertured support surfaces to support a fuel bed, such as coal particles, and through which combustion air passes. These apertured plates, commonly called "grates", are frequently fitted with motor driven vibration generators to feed and move the fuel bed over the grate surface which may also be inclined to the horizontal. Vibration is generally for short intervals and controlled automatically in response to the fuel load demand.

An example of an oscillating grate is described in U.S. Pat. No. 1,945,782, Jones. In that patent there is shown a grate which supports a fuel bed and through which air and/or steam passes. In order to prevent the concentration of heat in a central zone, the grate includes an inner conical section which is adapted to rotate within an outer circumferential zone. The apex of the cone is made eccentric with respect to the axis of rotation so that agitation may be imparted to the central portion of the fuel bed. It is said that the fuel bed receives a wavelike undulating movement and that the introduction of steam thereunder prevents clogging of openings in the grate.

Thus, prior art attempts at improving fluidized bed combustion systems have been diverse and largely directed to specific modifications. In essentially all instances such variations have nevertheless retained air or gas as the true fluidizing source for the bed. Thus, such prior art systems continue to possess the requirements associated with the use of air or/gas as a fluidizing source, including the need to take precautions against undesired entrainment of particles in the air and/or gas stream, gas tight construction to accomodate the quantities and pressures required for fluidization and compromise in the control of firing rates and combustion air qualities as well as the limitation of efficient combustion to units of specific sizes.

SUMMARY OF THE INVENTION

The present invention overcomes the drawbacks associated with fluidized bed combustion systems utilizing air and/or gas as the fluidizing source and provides for better control of the firing rates and combustion air qualities while allowing for economical use of fluidized bed combustion in combustion units of all sizes. This is achieved, according to this invention, through the provision of a fluidized bed combustion apparatus, system and process in which a turbulent fluidized motion is imparted to the particles to be burned by mechanical means.

An object of the present invention is the provision of a fluidized bed combustion apparatus, system and process in which the particle fluidizing force is produced by a mechanical means.

Combustion supporting air may be controlled, according to this invention, as a ratio of the fuel input rate or desired firing rate since the air is not required for fluidization. Accordingly, the apparatus, system and process of this invention are especially useful in furnaces that are to be fired at various rates where control of the fuel/air ratio is desirable.

Another object of this invention is the provision of a mechanically fluidized bed combustion apparatus, system and process which achieves better control of the firing rates and combustion air qualities with greater economical use in combustion units of various sizes.

The bed of combustible material may be fluidized on a fluidizing support screen which is vibrated by a motor drive. The fluidizing force may be directed so that, in addition to fluidizing the bed, it slowly moves the particles from a feed end of the bed to an ash or waste disposal end of the bed with combustion taking place during the travel from one end of the bed to the other. The degree of fluidization can be controlled by controlling vibration. The air necessary to support combustion at any given firing rate may be controlled by an inlet damper or by a variable speed combustion air fan controlled by a master combustion control system. Stack gas anlaysis may be used to trim the combustion control system.

Thus, a yet further object of this invention is the provision of an apparatus, system and process for fluidized bed combustion which results in increased efficiency and economy of operation and more widespread application.

The foregoing and other objects, features and advantages of this invention will be further apparent from the following detailed description of a preferred embodiment thereof taken in conjunction with the accompanying drawings.

DESCRIPTION OF THE PREFERRED EMBODIMENT

Figure 1:
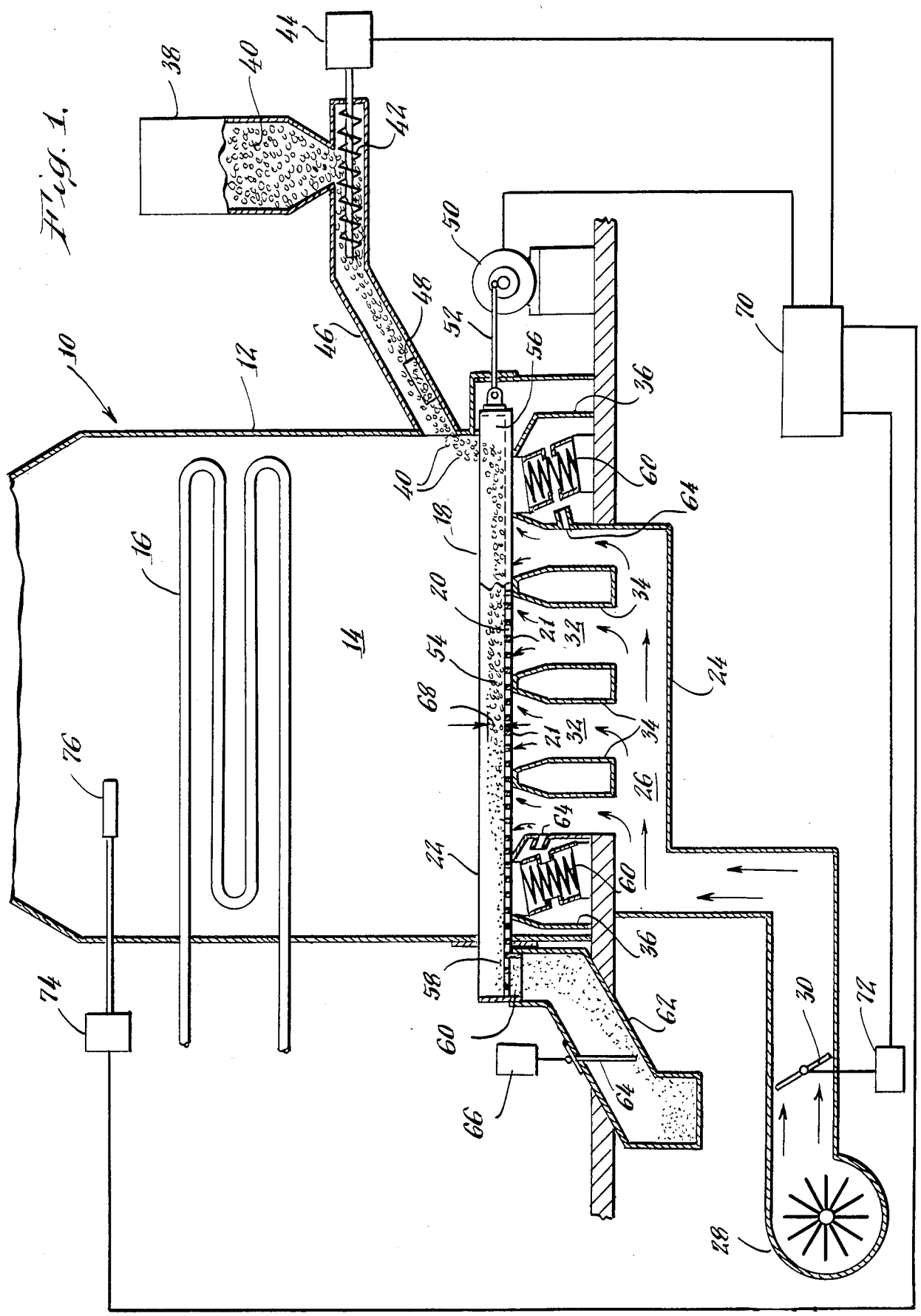
FIG. 1 is a side elevational view, partly in cross-section, of a fluidized bed combustion system according to an embodiment of this invention.

FIG. 1 shows a fluidized bed combustion system referred to generally at 10. The fluidized bed combustion system includes a furnace 12 defining a combustion chamber 14 in which particulate fuel, such as coal, is burned to produce heat which is used to produce steam, or otherwise heat a heat transfer medium, in the tubing 16.

The bottom of the combustion chamber 14 is defined by a fuel bed support vibrating screen unit 18 having a mesh grate screen floor 20, with openings 21 therein, and side walls 22 to contain fuel particles thereon. A windbox 24 located in the furnace 12 beneath the vibrating screen unit 18 defines a chamber 26 for providing combustion air to the combustion chamber 14.

The combustion air is provided by a combustion fan 28 and passes through the inlet damper 30 to the chamber 26. From the chamber 26 the combustion air enters the combustion chamber 14 through the inlet air ducts 32, as shown by the arrows, by passing through the openings 21 in the screen mesh 20. Guide vanes 34 distribute the air evenly across the bottom of the screen mesh 20 while the shrouds 36 reduce the possibility of air escaping around the screen unit 18 thereby providing a limit on the percentage of combustion air failing to reach the combustion chamber 14.

The material to be burned, in this case coal particles 40, is stored in the feed bin 38. The material is fed from the feed bin 38 to the furnace 12 by means of the screw conveyor 42 driven by the motor 44. The combustible material, the coal particles 40, is spread on the input end of the vibrating screen unit 18 by a feed chute 46 containing weirs 48, as shown in greater detail in FIG. 2. The vibrating screen unit 18 is driven by a motor 50 through an eccentric connection 52 to impart a vibratory motion thereto. This vibratory motion provides a turbulent fluidizing motion to the particles of coal to cause them to form a fluidized bed, indicated generally at 54. At the same time, the vibratory motion causes the coal particles 40 to move slowly from the input end of the screen, referred to generally at 56, located beneath the feed chute 46, to the discharge end, indicated generally at 58, as the particles are being burned.

The vibrating screen unit 18 is supported on springs 60 which are enclosed within the chambers 62. The chambers 62 communicate with the air chamber 26 by means of the vent openings 64 in order to supply cool air to the springs 60 to reduce their temperature and provide long serviceable life.

Figure 2:
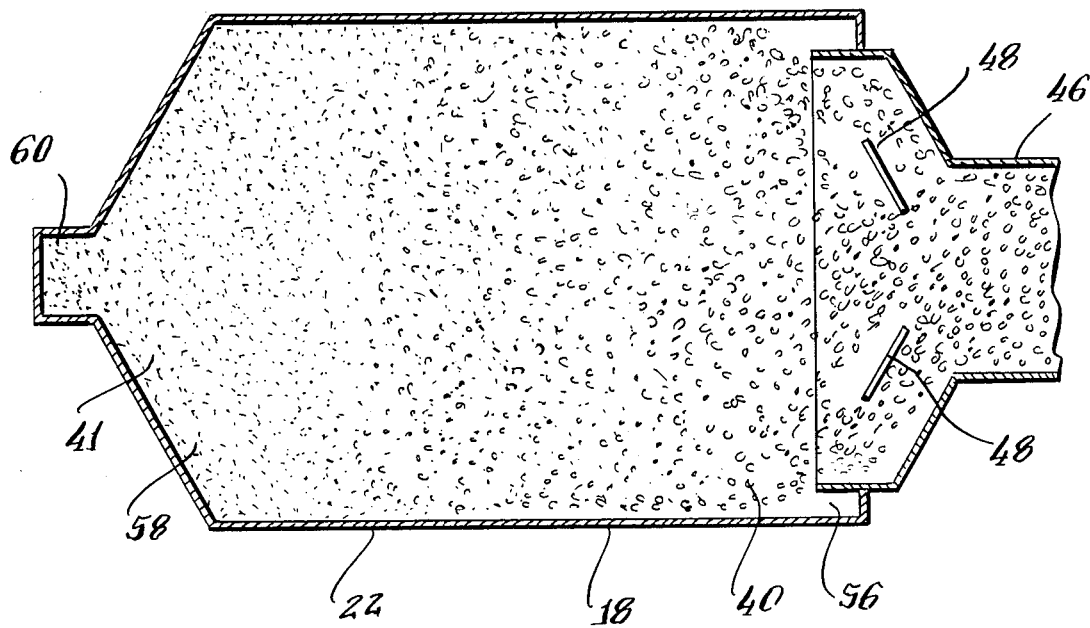
FIG. 2 is a top view of the fluidizing vibrating screen of the system shown in FIG. 1, showing the screen configuration and the particulate fuel input feed distributor (chute).

Certain features of the vibrating screen unit 18 are illustrated in the top view of the screen seen in FIG. 2. The screen mesh 20 contains openings 21 which are sized to allow the free passage of air but not the downward flow of any of the combustible materials, such as the coal particles 40, or additives used in a combustion process or the products of combustion such as the ash particles 41. Thus, the size of the mesh or screen is dictated by the size of the particles to be burned. When the combustion particles are minute, a base granular material heavier than the fuel, as well as additives, can be used to prevent clogging of the mesh. The upward flow of the combustion air through the mesh serves to constantly clean it.

The flow of the combustible material 40 from the input end of the bed 56 to the discharge end 58 is controlled at such a rate that the combustion process is completed when the ash, and additive residues if any, have reached the discharge cone 60. The vibration applied to the particles by the screen can be oriented and controlled by adjustment of the eccentric connection 52 and springs 60 to move the ash and residue out through the discharge cone 60 and through the ash pipe 62. The ash and residue is collected through a discharge damper 64, located in the ash pipe 62, either by manual control or on an automatic basis governed by the controller 66.

Referring specifically to FIG. 2, it can be seen that the input feeder 46 distributes the incoming combustible particles 40 as they are moved onto the vibrating screen 18 and fluidized bed 54 by the screw conveyor 42. As the combustible material 40 moves across the bed in the process of comb.ustion, it reduces in size. The products of combustion, ash, as well as any base granular material, exits the fluidized bed area through the discharge port cone 60. The level of the material in the fluidized bed 54, referred to at 68, (FIG. 1) can be varied by the control motor 44 operating the screw conveyor 42. The level of the bed can also be controlled by regulating the vibratory force applied to the screen unit 18 by the motor 50.

A master combustion control system, referred to generally at 70, can be utilized to control: the feed of solid material, by controlling the motor 44; the vibrating action of the fluidized bed, and degree of fluidization, by controlling the motor 50; and, the combustion air flow by regulating the damper 30, through the control unit 72. These controls can be made responsive to signals emanating from a signal device 74 responsive to input received from the emmission gas measuring unit 76 so as to provide a trim signal to the combustion control system 70 for improving the control of the firing system. The master combustion control system can therefore be programmed for the burning of different types of fuels at different rates with different fuel, air and bed movement ratios for each fuel so as to achieve greater efficiency and economy of operation as well as more wide spread application to different sized furnaces.

Those skilled in the art will recognize that modifications in the apparatus, system, and process described above can be made without departing from the invention. Thus, the surfaces to be heated, such as the tubing 16, can be located either above the fluidized bed 54, as shown, or in a separate waste heat recovery unit connected to the fluidized bed furnace 12 by duct work. Also, the combustible material can be material other than particulate coal and can include an additive as is known in the fluidized bed art. Furthermore, if desired, the fluidization obtained by the mechanical means described can be supplemented with fluidization achieved by passing air and/or gas upwardly through the bed.

The vibrating screen unit 18 can be controlled so as to move the bed in either direction along the screen and not just to the discharge end.

Thus, there has been disclosed an improved fluidized bed combustion apparatus, system and process in which the fluidizing force is produced by mechanical means and combustion supporting air and the mechanical means may be controlled relative to the type of fuel, fuel input rate and firing rate.

I claim:

1. A process for fluidized bed combustion of particulate combustible material in a furnace comprising feeding the particulate combustible material to the furnace, imparting a turbulent fluidized bed motion to the particulate combustible material within the furnace through the use of a vibrating screen connected to means for vibrating said screen as the principal source of energy for imparting the turbulent fluidizing motion to said combustible material, feeding combustion air to the fluidized bed of combustible material, discharging products of combustion from the furnace, and causing the fluidized bed to move in a substantially horizontal direction so that combustible material is conveyed from the location of feed to the furnace through a combustion stage in the furnace to the location of discharge for discharge as combustion products.

2. A process for fluidized bed combustion as claimed in claim 1 further comprising controlling the combustible material feed rates, the fluidized bed degree of fluidization, the fluidized bed movement from feed location to discharge location and the amount of combustion air to maximize combustion effectiveness and minimize pollution.

* * * * *